Sept. 8, 1931.  J. P. MORLEY  1,822,871
HEATING APPARATUS
Filed April 13, 1927    8 Sheets-Sheet 1

Inventor
James P. Morley
By Geo. B. Titts
Attorney

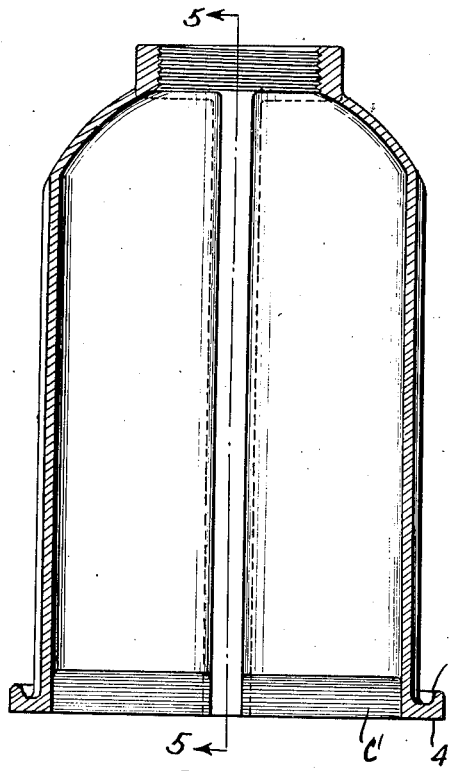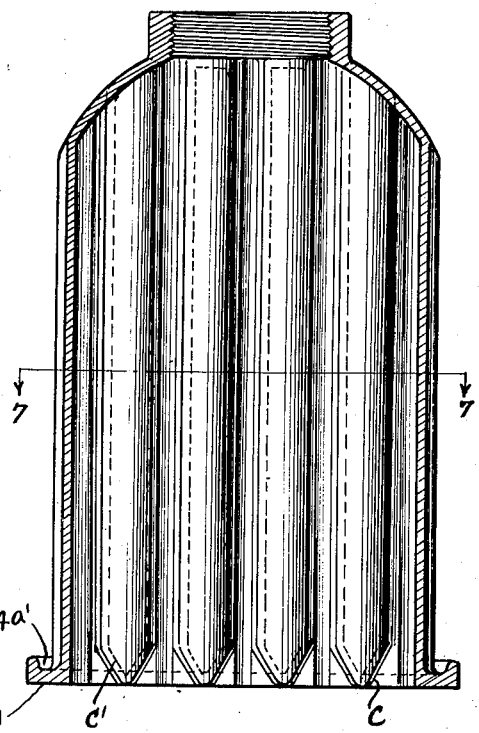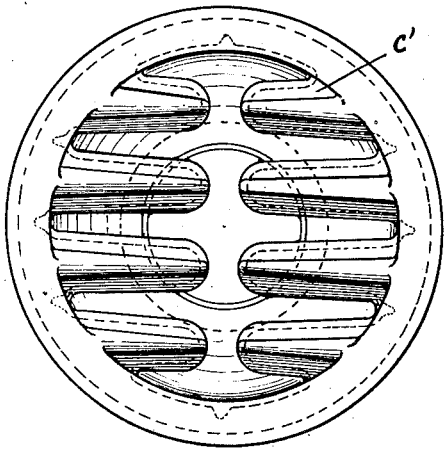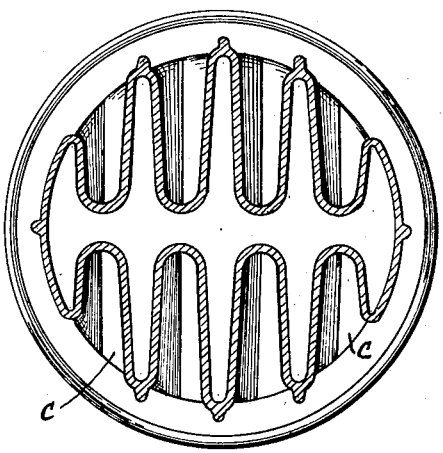

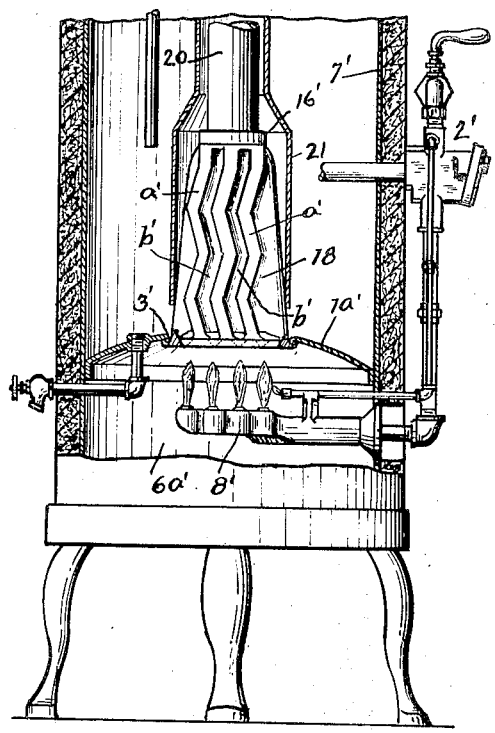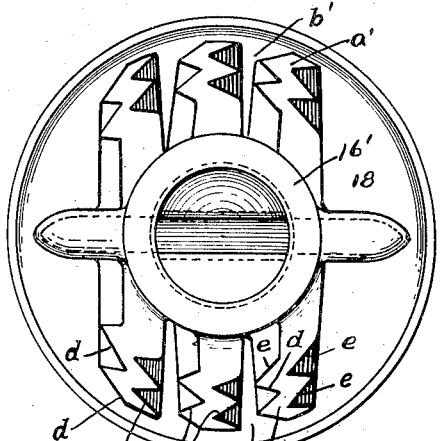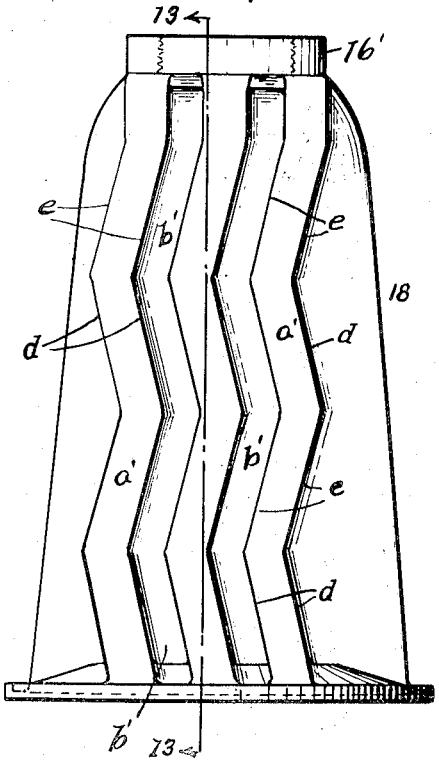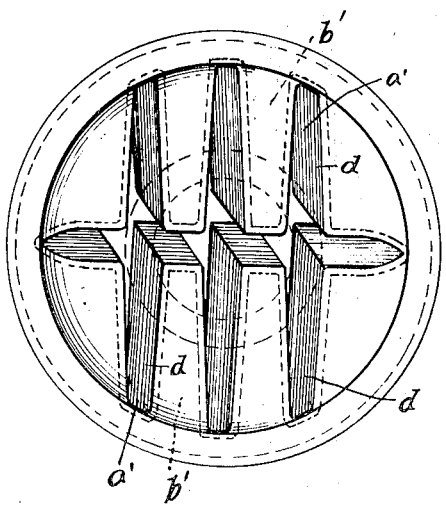

Sept. 8, 1931.    J. P. MORLEY    1,822,871
HEATING APPARATUS
Filed April 13, 1927    8 Sheets-Sheet 4

Inventor
James P. Morley
By Geo. A. Pitts
Attorney.

Sept. 8, 1931.  J. P. MORLEY  1,822,871
HEATING APPARATUS
Filed April 13, 1927  8 Sheets-Sheet 5
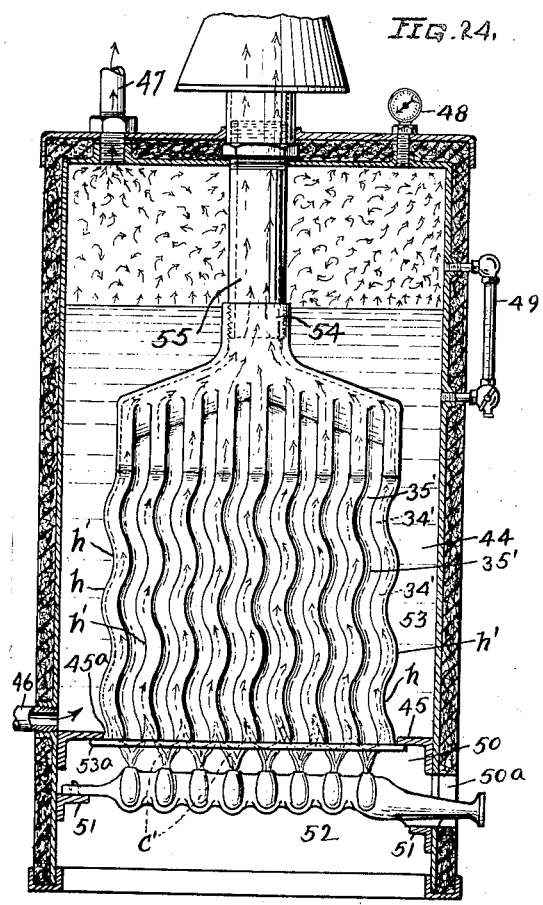
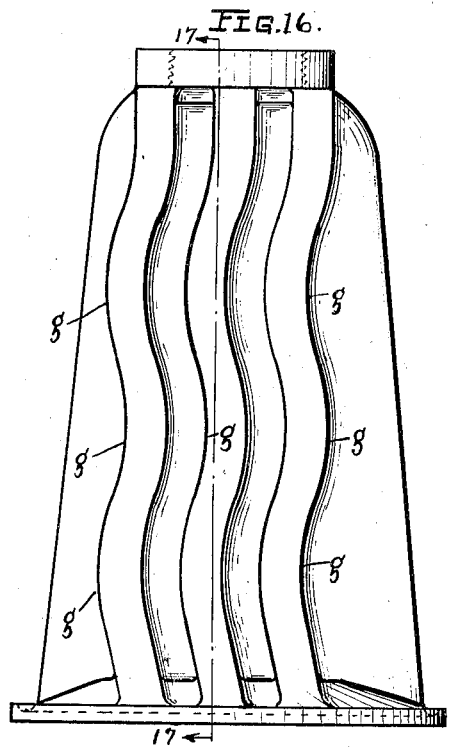
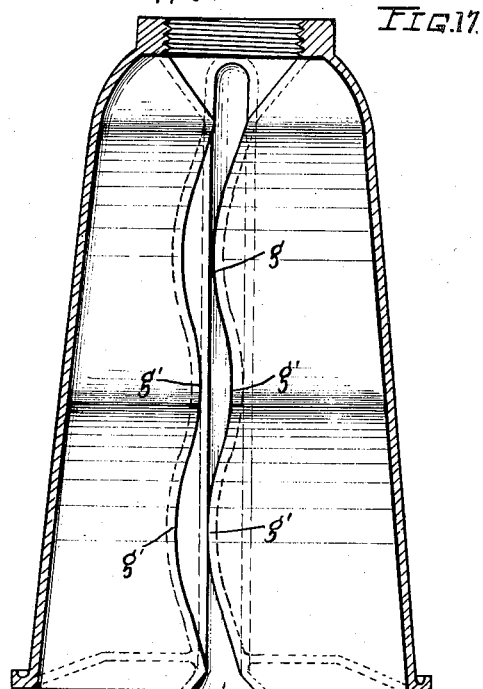
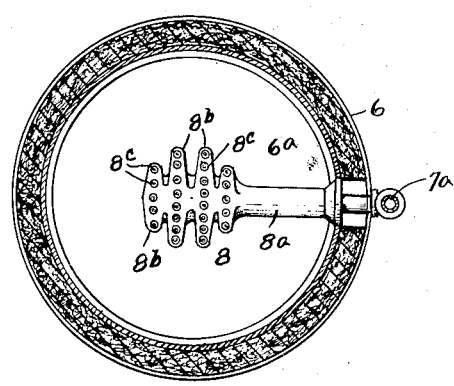
Inventor
James P. Morley
By Geo. B. Pitts
Attorney

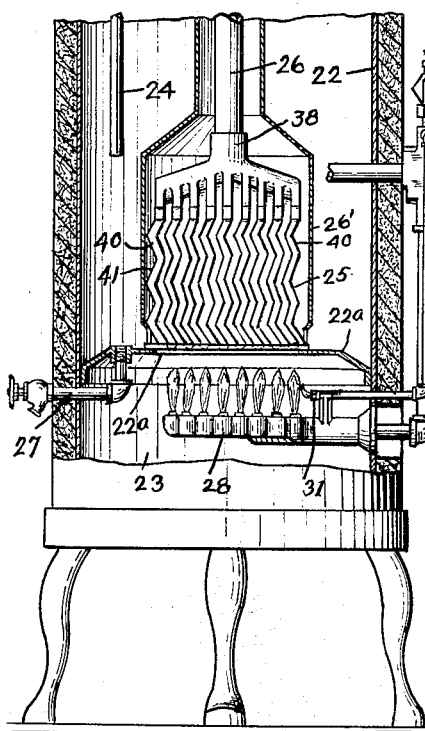
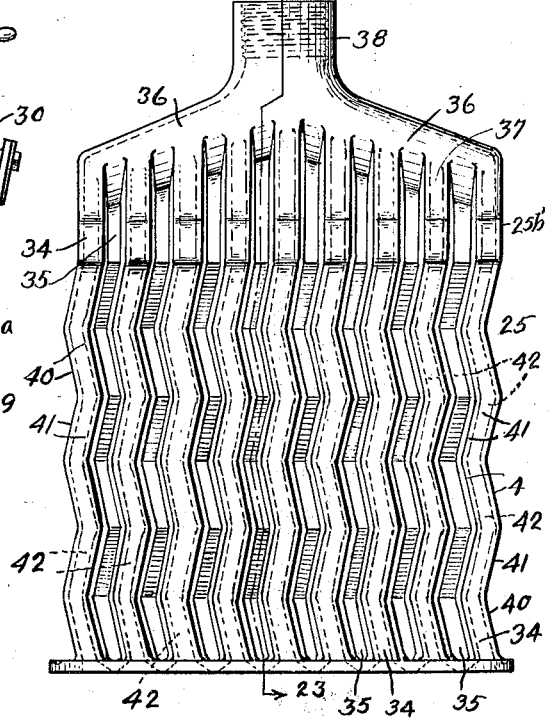
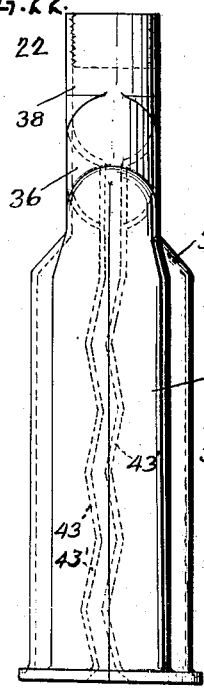
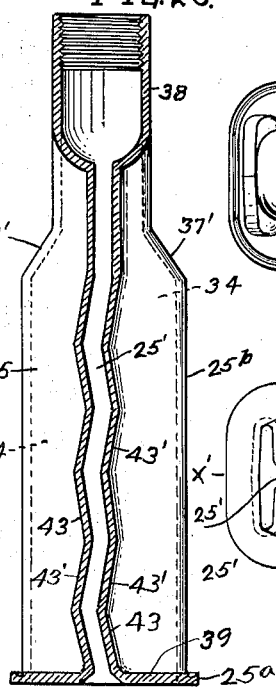
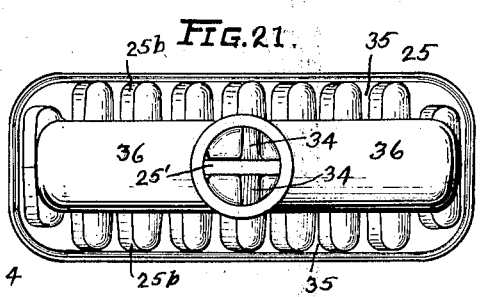
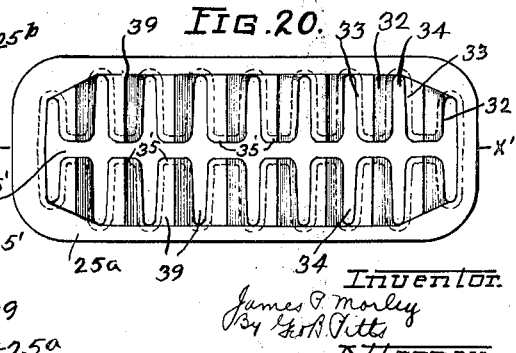

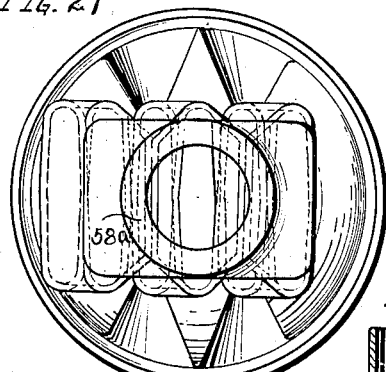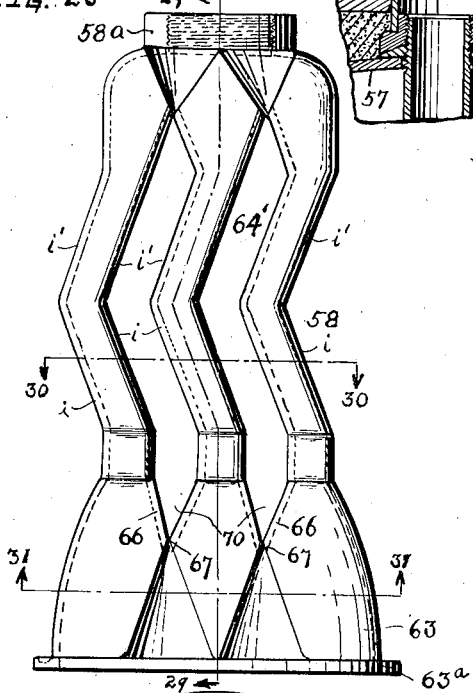

Sept. 8, 1931.   J. P. MORLEY   1,822,871
HEATING APPARATUS
Filed April 13, 1927   8 Sheets-Sheet 8
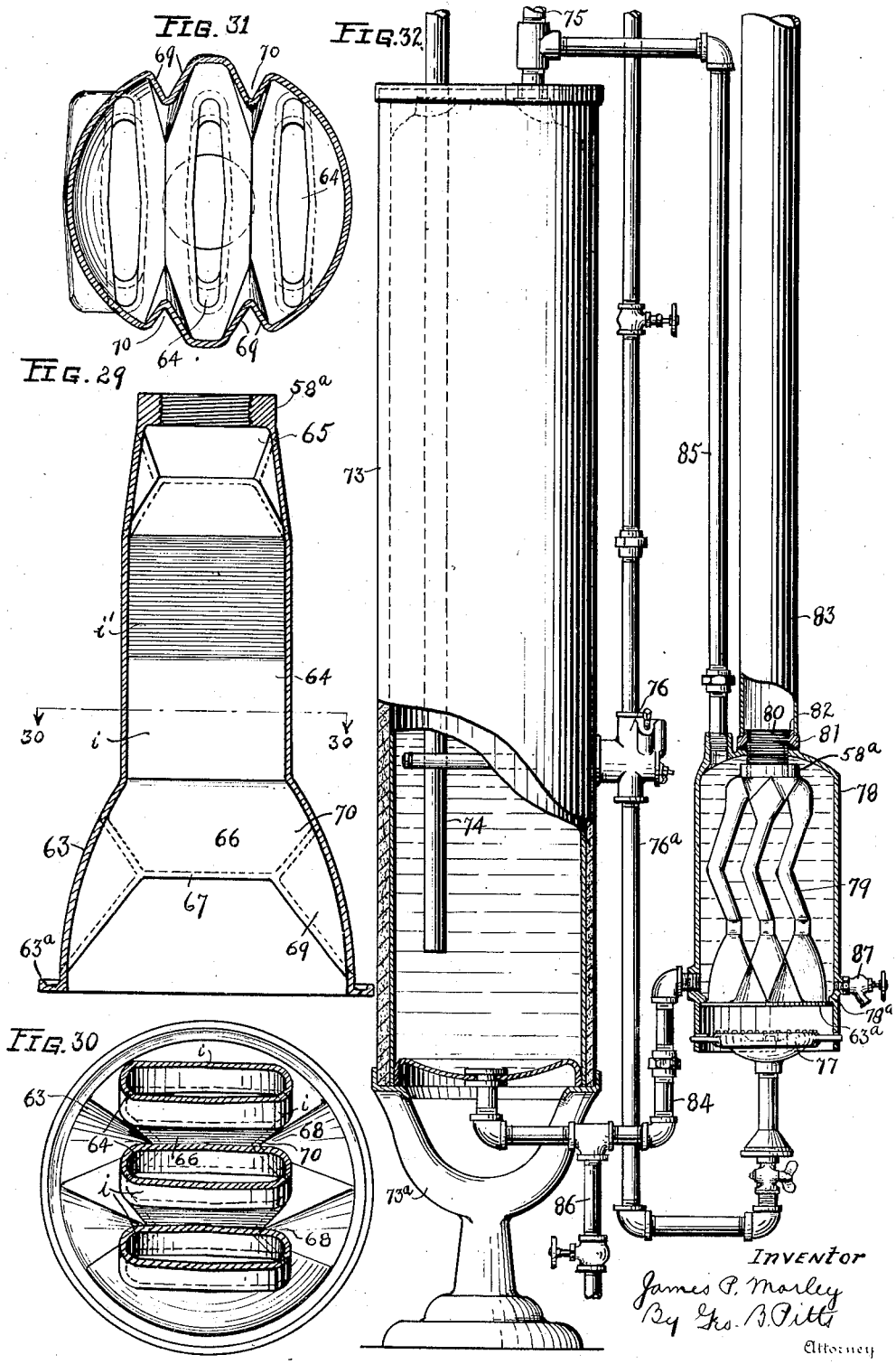
Inventor
James P. Morley
By Geo. B. Pitts
Attorney Patented Sept. 8, 1931

1,822,871

UNITED STATES PATENT OFFICE

JAMES P. MORLEY, OF MICHIGAN CITY, INDIANA, ASSIGNOR TO BASTIAN-MORLEY CO., OF LA PORTE, INDIANA, A CORPORATION OF INDIANA

HEATING APPARATUS

Application filed April 13, 1927. Serial No. 183,256.

This invention relates to a heating apparatus. The apparatus is adapted for heating a fluid, such as water, for dispensing and heating purposes, and also for the generation of steam. The invention is capable of adaptation in various other forms; for example, in hot water and steam heating systems and steam boilers of larger capacity and heating systems of the hot air and vapor types.

One object of the invention is to provide a heater which is capable of readily heating fluid with minimum consumption of fuel.

Another object of the invention is to provide an improved heater in which the gases and products of combustion as they rise upwardly are distributed and controlled in a manner to effect the absorption therefrom of a relatively high percentage of the heat units, whereby increased efficiency results.

Another object of the invention is to provide a heater for fluid in which is provided an improved heating unit or member having inter-related heat conduits or channels and fluid conduits or channels to effect a rapid circulation and economical heating of the fluid without causing liming on the surfaces of the channels in contact therewith, whereby the heating efficiency is maintained for an indefinite period of time.

Another object of the invention is to provide a heating unit having an improved form of construction whereby the heat or high temperature of the products of combustion are effectively applied or transferred to the fluid to induce a rapid circulation thereof.

Another object of the invention is to provide an improved heating unit that is compact and readily formed and in which provision is made for relatively large or extensive wall areas heated by the heating means or products of combustion therefrom and in contact with the fluid to be heated.

Another object of the invention is to provide a heater having an improved heat exchange or transfer unit constructed to provide an increased heated wall area between the products of combustion and the fluid, whereby the fluid is heated economically.

Another object of the invention is to provide a storage heater wherein the heat and products of combustion are conducted through the fluid tank or container and the conduit walls therefor are so constructed and arranged that the water is quickly heated to the desired temperature without waste of fuel.

Another object of the invention is to provide an improved heater that is relatively simple, compact and easily constructed and assembled.

Other objects of the invention will be apparent to those skilled in the art to which the invention relates from the following description taken in connection with the accompanying drawings, wherein Fig. 1 is a vertical section of a heater embodying my invention.

Fig. 4 is a vertical section on the line 4—4 of Fig. 2, but showing a slightly different form of construction.

Fig. 5 is a section on the line 5—5 of Fig. 4.

Fig. 6 is a bottom plan view of the unit shown in Figs. 4 and 5.

Fig. 7 is a section on the line 7—7 of Fig. 5.

Fig. 8 is a fragmentary view, partly in section showing another form of heating unit.

Fig. 9 is a side elevation of the heating unit shown in Fig. 8.

Fig. 10 is a top plan view of the heating unit shown in Figs. 8 and 9.

Fig. 11 is a bottom plan view of the heating unit shown in Figs. 8, 9 and 10.

Fig. 16 is a side elevation of the heating unit such as shown in Figs. 8 to 15, inclusive, but in which the walls are slightly modified to secure increased efficiency.

Fig. 17 is a section on the line 17—17 of Fig. 16.

Fig. 18 is a fragmentary view, partly in section, showing another construction of heater where either a large volume of water is required for dispensing purposes or the heated water is used for heating purposes.

Fig. 19 is a side elevation of the heating unit shown in Fig. 18.

Figs. 20 and 21 are bottom and top plan views, respectively, of the unit shown in Fig. 19.

Fig. 22 is an end view of the unit shown in Fig. 19.

Fig. 23 is a section on the line 23—23 of Fig. 19.

Fig. 24 is a sectional view of a steam boiler showing the use of my improved heating unit therein.

Fig. 25 is a vertical sectional view of a fluid heater embodying my invention having a heating unit of another form of construction.

Fig. 25a is an enlarged detail view of part of the casing top shown in Fig. 25.

Fig. 26 is a side elevation of the heating unit shown in Fig. 25.

Figs. 27 and 28 are top and bottom plan views of the unit shown in Fig. 26.

Figure 3:
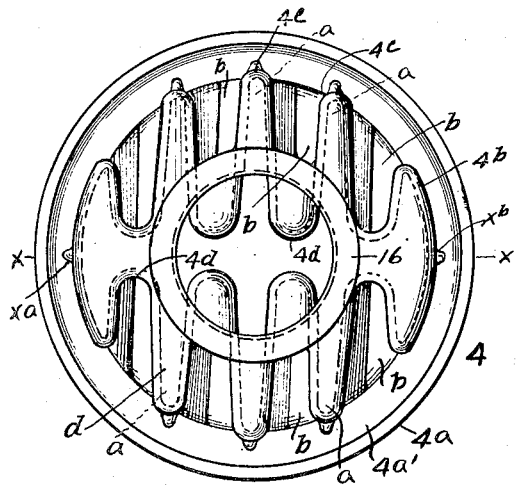
Fig. 3 is a top plan view of the heating unit.

Figs. 29, 30 and 31 are sections on the lines 29—29, 30—30 and 31—31, respectively, of Fig. 26.

Fig. 32 is a view partly in elevation and partly in section showing a heating apparatus embodying my invention, but in which the heating unit is mounted in a casing separate from the fluid storing tank; the heating unit shown being of the construction shown in Figs. 25 to 31, inclusive.

In the drawings, 1 indicates as an entirety a container for fluid, such as water. The water heated in the container may be used for various purposes, either for dispensing, such as for household uses, or for heating; that is, such container may be connected to or form part of a hot water or steam heating system for a building; furthermore, so far as the invention in its broader aspects is concerned, it may be adapted for use in heating air or water, or water to generate vapor for what is known generally as vapor and steam heating systems or for power purposes.

In the present form of construction I have shown my invention as adapted for (1) a storage type of water heater (see Figs. 1 to 23, inclusive and Figs. 25 to 32, inclusive) wherein the water is drawn off and used for domestic purposes and the fuel or combustible medium is automatically controlled by a suitable thermostatic mechanism such as indicated at 2, so that the water is heated to any desired temperature and maintained at approximately that temperture as long as desired; and (2) a hot water or steam heating system or power boiler (see Fig. 24).

As illustrative of the preferred form of construction, I have in certain views shown heaters wherein the heating means is associated with or incorporated in contiguous walls of the container so that the heat may be applied directly to the water in the container; but it is not intended that the invention is to be limited to this arrangement, as it is common to provide a separate heating means enclosed in or associated with a housing having an element to and from which the water in the container is circulated as shown in Fig. 32, and where this latter arrangement is desired, my improved heating units may be advantageously used.

Figure 2:
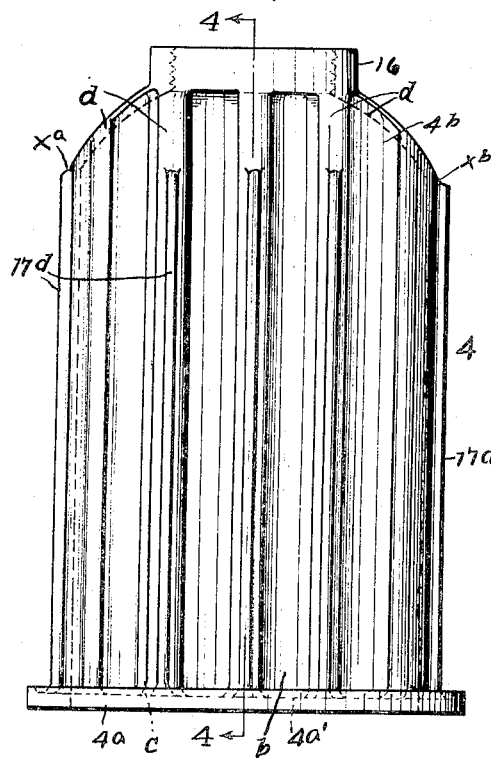
Fig. 2 is a side elevation of the heating unit shown in Fig. 1.
Figure 1:
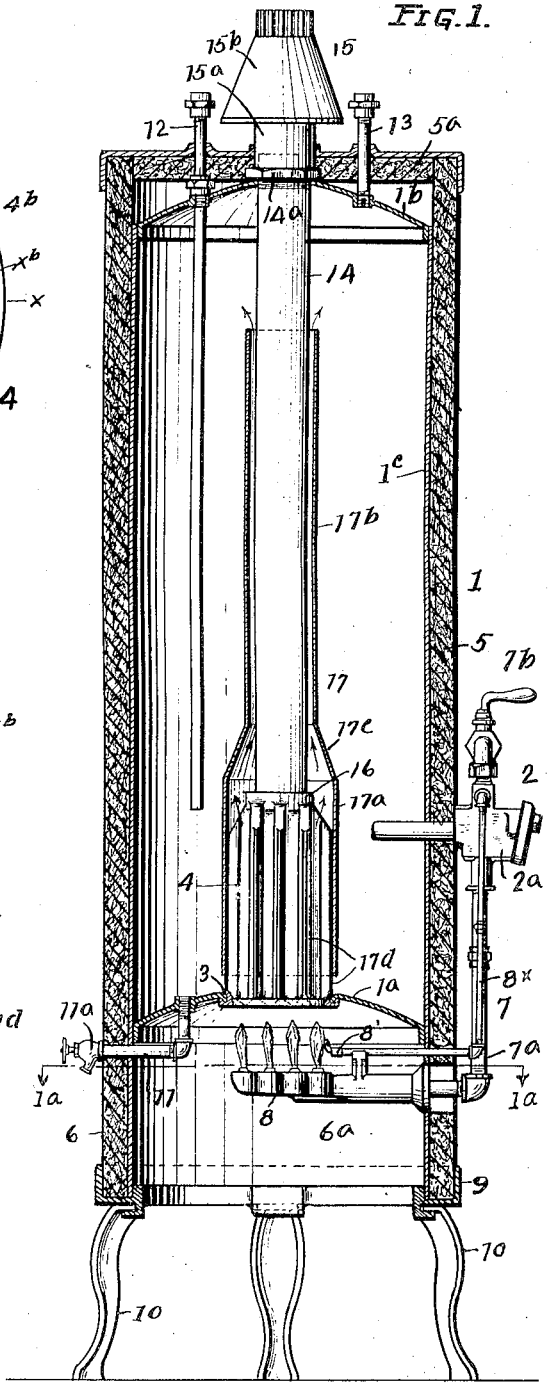
Fig. 1a is a section on the line 1a—1a of Fig. 1.
Figure 12:
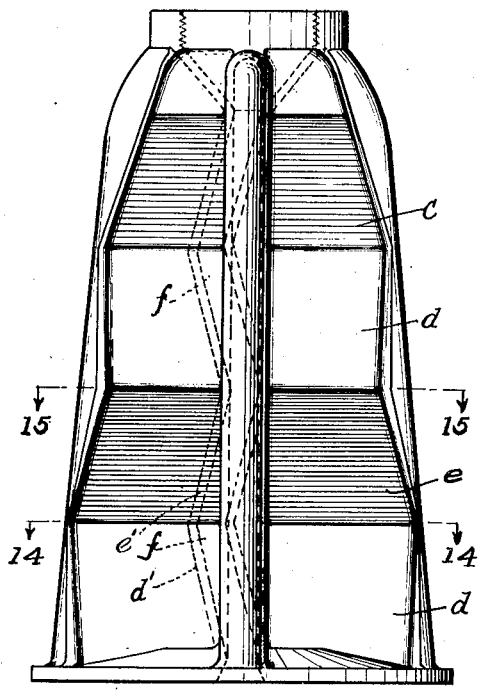
Fig. 12 is a side elevation of the heating unit shown in Figs. 8, 9, 10 and 11.
Figure 13:
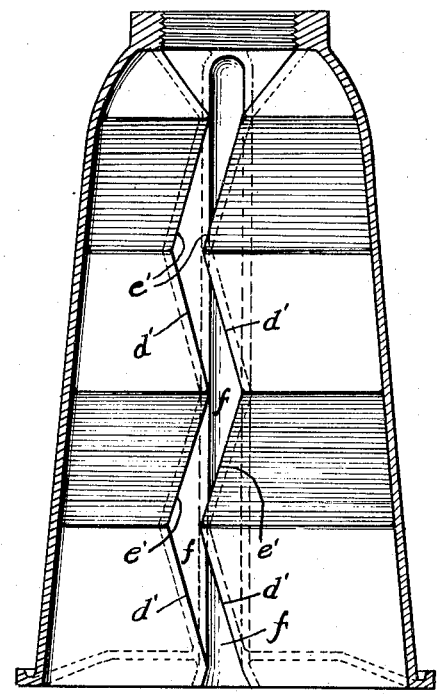
Fig. 13 is a vertical section on the line 13—13 of Fig. 9.
Figure 14:
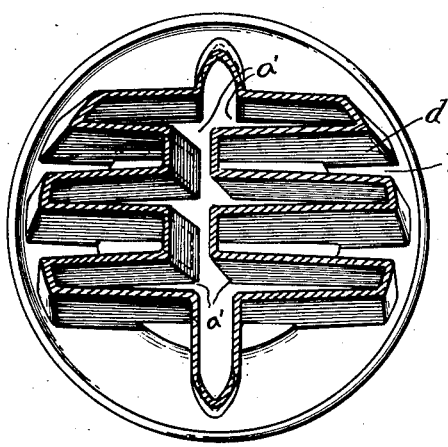
Fig. 14 is a section on the line 14—14 of Fig. 12.
Figure 15:
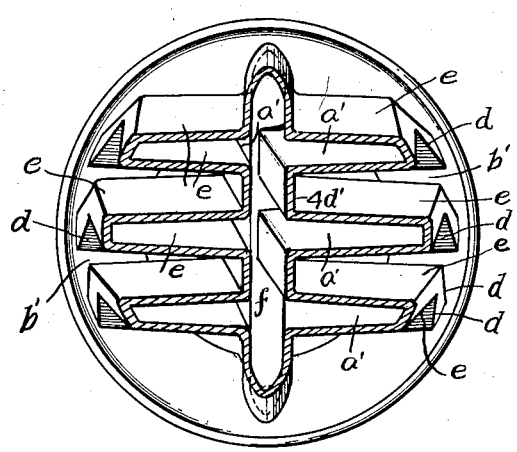
Fig. 15 is a section on the line 15—15 of Fig. 12.

Referring to Figs. 1, 2 and 3, the container 1 comprises a suitable tank having a bottom 1a, a top 1b and a side wall 1c. The bottom 1a is formed with an opening 3 in which a heating unit, indicated as an entirety at 4, is suitably mounted. The opening 3 is preferably disposed centrally of the bottom 1a. The walls of the container and the connection between the bottom wall 1a and walls of the unit 4 are constructed to form a liquid tight container, as will later appear. The side wall 1c and top 1b are suitably jacketed, as shown at 5, to prevent heat radiation. In the illustrated form of construction the jacket consists of asbestos, but it may consist of a spaced wall to form a dead air space. The side wall 1c and jacket 5 may be extended downwardly beyond the bottom 1a to provide a skirt 6, which forms a fire box or chamber 6a, preferably open at its lower end to admit sufficient air for combustion purposes, and also sufficient air to effect primary combustion where the heating or combustible medium has not been mixed with air for this purpose.

The heating medium preferably consists of a fluid (either in gaseous or liquid form). In practice I prefer to use natural or artificial gas, supplied by a pipe 7, this pipe being connected to the casing 2a of the thermostatic mechanism 2 and leading therefrom, as shown at 7a. The pipe 7a leads through suitable openings in the skirt 6 and is connected to a burner 8, to which reference will later be made. The supply of gas may be controlled by a valve 7b.

8' indicates a suitable pilot, the gas for which is supplied by a pipe 8x connected to the source of supply at a point beyond the thermostatic mechanism 2. The lower ends of the jacket 5 and wall 1c may be reinforced by a U-shaped ring 9, into which they fit and such ring may form a suitable base member for legs 10, whereby the container 1 is supported on the floor, as shown in Fig. 1. The bottom 1a is preferably inclined upwardly from the side wall 1c or of substantially spherical shape, so that the air and heat may be directed toward and into the heating unit 4. 11 indicates a drain pipe preferably leading through the bottom 1a and then laterally through the skirt 6 and carrying a suitable valve 11a. 12 indicates a pipe leading from a source of water supply. The supply pipe 12 preferably leads through suitable openings in the jacket top 5a and wall 1b and extends downward into the container 1 to its lower portion. 13 indicates the outlet pipe, also by preference, leading through suitable openings formed in the top wall 1b and top wall 5a of the jacket 5. The pipe 13 leads to various points or stations where the heated water is to be used. Where the apparatus constitutes a storage heater, as shown in Fig. 1, the container is maintained filled at all times by the supply pipe 12. 14 indicates a flue for the escape of the products of combustion and vapors, preferably extending axially through the container 1 and openings formed in its top 1b and the jacket top. Above the jacket top, the flue 14 may be provided with a draft regulator 15. The regulator 15 comprises a tubular member 15a and a conical member 15b surrounding and spaced from the upper end of the member 15a and the upper end of the conical member being connected to a chimney. The lower end of the flue 14 is connected in a liquid tight manner to the upper end of the heating unit 4, being preferably screw-threaded into a collar 16 provided thereon, as will later appear. By this construction, the heat and products of combustion and vapors incident thereto flow through the heating unit 4 and the products and vapors escape through the flue 14.

The heating unit 4 comprises a casing which may be cast or other-wise formed. The unit 4 is disposed vertically within the container 1. Around its lower end is a flange 4a to which the wall of the opening 3 is secured in any well known manner to (a) support the unit on the bottom and (b) to insure a liquid tight joint. The upper side of the flange 4a is preferably provided with a groove or recess 4a' into which the edge of the wall around the opening 3 is suitably secured, a gasket being also used to insure a liquid tight joint. The upper end of the flue 14 is provided with screw threads to take a nut 14a, which when tightened against the top 1b, serves to support the flue and through the connection of the latter with the unit 4, to support the unit and flue in rigid relation to each other and the container 1. The nut 14a is provided with an up-standing neck or tubular section 14a' on which the lower end of the tubular member 15a removably fits to support the draft regulator 15 in position; the opening in the jacket top 5b being large enough to admit this member. The side wall 4b of the casing, instead of being of cylindrical form, is shaped to provide inter-related circulation bays or channels to insure proper distribution of the heat and products of combustion and rapid circulation of the water. In this improved form of construction the areas of the surfaces acted on by the gases and products of combustion and in contact with the water are materially increased; at the same time the casing is compact and occupies but little space. In the present form of construction, each portion of the side wall 4b at either side of an imaginary line $x$—$x$ (Fig. 3) extending diametrically from one portion $x^a$ of the side wall to another portion $x^b$ thereof, is corrugated on vertical lines from end to end, that is, each portion of the side wall 4b, commencing at one portion ($x^a$) and ending at the opposite portion ($x^b$), extends in a substantially zigzag direction or alternately inwardly and outwardly, to form a series of bays $a$ (relatively long in a direction transversely of the casing) for the passage or flow of the products of combustion, each merging or opening along its inner portion into the interior space or main passage 4' through the casing, and a series of bays $b$ (relatively long in a direction transversely of the casing) for the circulation of the water, each merging or opening along its outer portion into the container 1 or the space within a circulation shell or casing 17, to which reference will later be made. In the form of construction now being described the walls forming the bays extend from points substantially co-inciding with the flange 4a inwardly to approximately the central portion of the unit casing or close to the imaginary line $x$—$x$, so that the gases and products of combustion are broken up into relatively long, narrow currents, as they flow through the unit to insure the transfer of heat effectively to the walls of the bays. The bays $a$, $b$, preferably extend longitudinally substantially from end to end of the casing and on each side of the line $x$—$x$ the bays $a$, $b$, are alternately arranged and their walls are disposed substantially parallel to each other in planes at right angles to said line. In this arrangement (a) the walls forming the bays $a$ constitute the walls which form the bays $b$, so that the water is in contact with one surface of these walls and the heat and products of combustion are in contact with the other surface thereof as the latter flow through the bays $a$ and passage 4'; and (b) each bay $a$ for the products of combustion is surrounded on substantially three sides with walls in contact with water and each bay $b$ for a column of water is surrounded on substantially three sides by heated walls.

By forming the side wall in the manner above set forth the surface area in contact with the heat and products of combustion on one side of such wall and the surface area in contact with the water on the opposite side of such wall are materially increased, so that a substantial increase in efficiency and a decrease in the amount of fuel required results. This form of construction also provides a heating unit that is compact and relatively small, and capable of use in standard sized containers without affecting its storage capacity. As a result of this construction the products of combustion are distributed into a plurality of relatively narrow, long passages so that in the flow of the products of combustion from end to end thereof, the absorption of heat therefrom by the walls of the passages and the transfer of the heat to the water is complete and likewise a relatively strong rising current is induced in the water in the bays $b$ to ($a$) enable the heat conducted through the bay walls to be rapidly absorbed and ($b$) insure a scouring action on the walls forming the bays $b$ to prevent liming thereon.

The sides or walls forming the bays being vertical minimizes the accumulation of lime and other precipitate thereon. By causing a rapid circulation of the water, the possibility of liming is greatly decreased.

The walls of the bays are preferably connected along their outer longitudinal edges by curved walls $4c$ and along their inner longitudinal edges by curved walls $4d$, such curved walls tending to prevent the accumulation of carbon and products of condensation within the bays $a$ and precipitated matter and lime within the bays $b$ or on the surfaces in contact with the water. The bays $b$ are closed at their lower ends by webs $c$, which are preferably formed integral with the side wall $4b$ and flange $4a$; whereas the upper ends of the bays $a$ are closed by upwardly and inwardly curved end walls $4e$, which direct or guide the products of combustion inwardly into the passage $4'$ and toward the collar 16.

As shown in Fig. 3 the inner ends of the bays open or merge throughout their length into the passage $4'$ and this enables the gases and products of combustion in the several bays to intermingle one with another and accordingly insure an equalization of temperature throughout all portions of these products, so that a positive and equal or uniform flow takes place in all of the bays $a$. As a result, the walls of the bays are heated more effectively and substantially uniformly. As the walls forming the bays $b$ are relatively close and substantially parallel, the water circulating in and through each bay $b$ formed by these walls constitutes a relatively thin water column, whereby it is readily heated and caused to rise rapidly relative thereto and to thus rapidly absorb the heat conducted through these walls. As the water, which rises, is replaced by colder water, the transfer of heat to the entire body of water is rapidly effected.

The walls of the unit 4 and flue 14 may be formed from any suitable material. Each may be formed from sheet stock and also from a material which has a relatively high co-efficient of heat conductivity.

The burner 8 is preferably constructed for correlation with the walls of the heating unit 4. As shown in Fig. 1$a$, the burner consists of a main conduit $8a$ preferably extending horizontally diametrically across and below the unit 4, but in spaced relation thereto, and carries on its opposite sides laterally extending hollow branches or arms $8b$ substantially in alignment with the end walls or webs $c$, these branches being formed with ports or jet openings $8c$ through which the gas flows for combustion. In this arrangement, ($a$) the gas jets are directly below the webs $c$, and the latter act as baffles to deflect the heat and products of combustion laterally into the two adjacent bays $a$ and ($b$) the lower portions or extremities of the walls forming the bays $a$, $b$, are heated to insure circulation of the water at the lowest point in the bays $b$.

The circulation casing 17 is preferably provided in order to guide the water into contact with the unit 4 and flue 14 and thereby to permit the heat transferred or conducted through its walls to more effectively induce a circulation of the water in direct contact with the unit so that the entire volume of water is set into circulation, and all portions become quickly and substantially uniformly heated to the desired temperature or maintained at substantially this temperature. The casing 17 consists of a main section $17a$ which surrounds the unit 4, an upwardly extended section $17b$ which surrounds the flue 14 but in spaced relation thereto, and an inwardly inclined section $17c$ connecting the main section with the upper section. The main section $17a$ is preferably fitted to the walls $4c$, which serve to support the casing in position, these walls being provided with longitudinal ribs $17d$ forming seats for the section $17a$. The lower end of the section $17a$ is open and terminates in spaced relation to the flange $4a$, thereby forming ample space for the water in the lower portion of the container 1 to flow into the bays $b$. By inclining the bottom $1a$ upwardly, the flow of the water into the bays $b$ tends to prevent the accumulation of sediment therein on the webs $c$. The section $17b$ extends upwardly toward the top $1b$ and is open at its upper end so that the heated water is discharged well above the colder portions of the water in the container 1.

The thermostat mechansm may be of any standard or preferred form of construction, such as illustrated in patents Nos. 1,367,935 and 1,581,712 to C. M. Yoder; such mechanism serving to control the supply of gas to the burner 8, dependent upon the temperature of the water in the container 1. By adjusting the thermostat mechanism, the water may be heated to and maintained at various temperatures as desired. Where the container 1 is of cylindrical shape the thermostatic elements extend inwardly from the wall 1c to one side of the shell or casing 17. In view of the disclosures in these patents, it is not deemed necessary to illustrate or further describe the thermostatic mechanism 2.

Figs. 4, 5, 6 and 7 illustrate another form of heating unit in which the webs $c$, instead of being horizontal or flat, are V-shaped, as shown at $c'$. In this form of construction the apexes of the V-webs are in line with the flame jets of the burner 8, so that the heat and products of combustion rising from the jets are divided and directed into the adjacent bays $a'$.

Figs. 8 to 15, inclusive, show another form of construction embodying the invention. In these views, 1' indicates the container, having a bottom 1$a'$ formed with an opening 3'. 2' indicates the thermostatic mechanism, 6$a'$ indicates the fire chamber, 8' indicates the burner in the fire chamber, and 18 indicates the heating unit mounted in the opening 3', its lower open end being secured in a liquid tight manner to the walls thereof and communicating with the fire chamber 6$a'$. The upper end of the unit is provided with a collar 16' to which the lower end of the flue 20 is connected preferably in a manner similar to that shown in Fig. 1. 21 indicates the circulation casing surrounding the unit 18 and flue 20. In this form of construction, the walls forming the bays $a'$, $b'$, instead of being straight from end to end, are shaped to provide angularly arranged sections $d$, $e$, inclined in opposite directions, the walls $d$—$d$ and $e$—$e$ of each section being substantially parallel and thus producing passages having portions disposed at angles to each other throughout the length of the bays. The heat and products of combustion flowing through each bay $a'$ will be deflected against successive wall sections $e$, $d$.

The lateral side or connecting walls 4$d'$ of the two series of bays $b'$ are shaped longitudinally or from end to end to provide sections $d'$, $e'$, disposed at angles to each other (see Fig. 13), the respective wall sections $d'$, $e'$, of the lateral wall for each bay $b'$ being substantially parallel to the corresponding walls for the opposite bay to form between them connected sections $f$ disposed at angles to each other from bottom to top of the unit.

As a result of this form of construction, the heat and products of combustion flowing through the bays $a'$ and passage 4' are deflected, as well as mixed and agitated, and hence are more effectively brought into contact with the bay walls to insure greater transfer of heat thereto. As the angled sections $d$—$e$ and $f$ extend from end to end of the bays $a'$ and passage 4', the mixing and agitation of the products of combustion continues throughout their flow through the unit, so that substantially all portions thereof, during their travel come into contact with the bay walls, and are enabled to give up a high percentage of their heat units to the walls with which the water contacts.

The walls $d$—$e$ and $d'$—$e'$ or either thereof as desired, may consist of straight sections, as shown in Figs. 8 to 15, inclusive, or either or both thereof may be connected by curved portions or such walls may be curved as shown at $g$, $g'$, respectively in Figs. 16 and 17.

In the forms of construction so far described, the heating units are of cylindrical shape to conform to the general form or shape of containers now in common use, although they may be otherwise shaped, if desired. Where a relatively large volume of hot water is required for dispensing purposes or where the heater forms a part of a hot water heating system, I prefer to provide a heating unit of substantially rectangular shape in cross section, as shown in Figs. 18 to 23, inclusive.

In these views, 22 indicates the container for water, which may be of any desired size and shape in cross section, that shown in Fig. 18 being cylindrical and constructed preferably in a manner similar to the container shown in Fig. 1. The bottom 22$a$ of the container is formed with an opening 22$a'$. 23 indicates the fire box or chamber disposed below the container bottom 22$a$. 24 indicates the intake connected to a source of water supply or the return hot water pipe as the case may be; the outlet pipe not being shown. 25 indicates as an entirety the heating unit mounted on the bottom 22$a$ and secured to the wall of the opening 22$a'$ in a liquid tight manner. The lower open end of the unit is in communication with the fire chamber 23. 26 indicates a flue connected to the upper end of the heating unit, as will later appear, and extending upwardly through the container and its top walls (not shown). 26' indicates a circulation casing associated with the heating unit 25 and surrounding it and the flue 26. 27 indicates a suitable drain. 28 indicates the burner preferably adapted for burning natural or artificial gas and connected to a supply pipe 29. 30 indicates a suitable thermostatic mechanism to which the supply pipe 29 is connected, whereby the flow of gas through the pipe is dependent upon the temperature of the water, in a well known manner. 31 indicates a pilot for the burner, its supply pipe 31$a$ being connected to the gas supply so as to burn independently of the operation of the thermostatic mechanism 30.

The heating unit 25 may be cast or otherwise formed and it may also be constructed from a material which has a relatively high co-efficient of heat conductivity. In this form of heating unit a flange 25$a$ is provided around its lower end, this flange engaging with and being secured in a liquid tight manner to the bottom 22a around the opening 22a' therein. The opening 22a' corresponds substantially to the shape of the flange, but is slightly smaller in size to form a support for the unit without obstructing the flow of the heat and products of combustion into and through the walls of the unit. Each side wall 25b throughout its vertical portion is corrugated on vertical lines or extended in a substantially zigzag direction or inwardly (as shown at 32) and then outwardly (as shown at 33) from end to end of the unit to form series of bays 34, 35; the lateral side walls of the latter being disposed in a plane spaced from the imaginary median line $x'$—$x'$ (Fig. 20) to provide a central passage 25' through the unit. The bays 34 are open at their lower ends, as will be understood from Fig. 20. The upper portions of the side walls 25b and end walls 25b' are shaped to provide manifolds 36 extending from the opposite ends of the unit inwardly, and the lateral longitudinal side walls 37 of the bays 34 converge inwardly, at their upper ends, as shown at 37' (see Figs. 19, 22 and 23), so as to direct the gases and products of combustion into the manifolds 36. The inner ends of the manifolds are connected to an upwardly extending tubular member 38 into which the lower end of the flue 26 fits and is secured (being preferably screw threaded therein) to form a liquid tight joint. The bays 35 are closed at their lower ends by webs 39, which are preferably V-shape in cross section (see Figs. 19 and 23). As will be understood, the series of bays 34, 35, along either side of the unit are alternately arranged in side by side relation, and extend from the bottom to the top and are disposed at right angles to the median line $x'$—$x'$ or major axis of the unit; also that the bays 34 open along their inner portions into the passage 25' and the bays 35 open along their outer portions into the container 22 or the space enclosed within the casing 26'.

I prefer to construct the bays 34, 35, and passage 25' with portions or sections disposed at angles to each other, so that the heat and products of combustion will be deflected against successive walls of these sections to more effectively agitate and mix them as already set forth in connection with Figs. 8 to 17, inclusive. For this purpose, (a) the walls 32, 33, forming the bays 34, 35, comprise sections 40, 41, disposed at angles to each other one section being inclined oppositely to adjoining sections and corresponding sections of the walls being substantially parallel, so that the bays 34, 35, between them, instead of being straight from end to end, consist of sections 42 each disposed at an angle to the adjacent sections; and (b) the lateral, longitudinal side walls 35' of the bays 35 are shaped to provide sections 43, 43', disposed at angles to each other, each section 43, 43', on each wall 35' being parallel to the opposed section on the wall 35' of the aligned bay on the opposite side of the median line $x'$—$x'$, to form between the bay walls 35' a central passage having sections inclined in opposite directions as shown in Figs. 22 and 23.

The circulation casing 26' is shaped to fit around the unit 25, preferably resting at its lower end on the flange 25a. The lower edge of the casing 26' is formed with a plurality of openings through which the water flows so as to contact with the walls of the unit, and to replace those portions which have been heated and caused to rise upwardly through the unit or casing. The upper end of the casing 26' is open to direct the heated water into the upper portion of the container.

If desired, more than one heating unit may be mounted in the container. Where the units are of substantially rectangular shape, as shown in Figs. 18 to 23, they may be arranged in side by side relation.

In Fig. 24 I have shown my improved heating unit incorporated in a boiler 44 wherein the water is heated to generate steam for power or heating purposes. In this view, the boiler casing is preferably of rectangular shape having sides, a top and a bottom 45 suitably connected, the bottom being formed with an opening 45a. The sides and top of the boiler are preferably jacketed in a well known manner. 46 indicates the inlet for the feed water, controlled by a valve (not shown) and 47 indicates the steam outlet connected to a heating system or leading to a steam engine, as the case may be. 48 indicates a pressure gauge. 49 indicates a water gauge. 50 indicates a fire box or chamber, having an opening 50a at one side. The walls of the fire box are provided with supporting bars 51 on which suitable grate bars may rest. I have shown, as a suitable heating means, a burner 52 which rests on the bars 51. The bars 51 may be arranged to support the burner at any desired distance below the boiler bottom or heating unit so that heat and products of combustion may flow up through the bays of the unit. In Fig. 24 the jets are shown in contact with these walls but they may be arranged so as not to contact therewith. The burner is preferably of a type capable of burning gas or oil. The burner 52 is constructed to provide transverse rows of jets. 53 indicates the heating unit within the boiler. The lower end of the unit is mounted in the opening 45a, its flange 53a being secured to the wall of the bottom 45 around the opening 45a in any desired manner to insure a liquid tight joint between them. The upper end of the unit is provided with a tubular member 54, one wall of which (preferably its inner wall) is threaded and a hollow conduit 55 has, at its lower end, screw threaded connection with such member to form a liquid tight joint and to support the unit in upright position. The upper end of the conduit 55 leads through an opening formed on the top wall of the boiler and is externally threaded to receive a nut 56, which when tightened against the top wall serves to pull upwardly on the conduit 56 and thus support it and also partially support the unit 53, as well as to maintain it in upright rigid position. The conduit 55 serves as an outlet for the gases and products of combustion.

The unit 53 is similar in construction to the heating unit shown in Figs. 18 to 23, inclusive, except that the sides of the bays 34′, 35′, instead of being formed of oppositely inclined sections, they are corrugated on horizontal lines or curved laterally in opposite directions, as shown at $h$, $h'$, to effect baffling of the heat and products of combustion in the bays 34′ with resulting mixing and agitation. Likewise the opposing lateral side walls (not shown) of the series of bays 35′ may be corrugated as shown at $d'$, $e'$, Fig. 13 or curved laterally in opposite directions in a manner similar to the curvature of the corresponding walls $g'$ shown in Fig. 17. The rows of flame jets of the burner 52 are preferably arranged in the planes of the webs $c'$ which close the lower ends of the bays 35′, each of these webs being preferably V-shape in cross section. The walls of the bays 34′, 35′, may be constructed as shown in Figs. 18 to 23, when desired. In this adaptation of my invention I prefer to maintain the water level in the boiler approximately at the upper end of the tubular member 53, although this may vary as conditions require. The capacity of the boiler may be increased by using more than one unit, as circumstances dictate, the size of the boiler being increased accordingly.

Referring to Figs. 25 to 31, inclusive, 57 indicates a container constructed similar to the container 1 shown in Fig. 1, its spherical bottom being formed with a central opening in which is mounted a heating unit 58 different in construction from those heretofore described, but embodying my invention. 59 indicates the flue connected at its lower end to the collar 58a, which is provided at the upper end of the unit, and extending through the top of the container 57 (see Fig. 25), the flue being connected to the container top and the draft regulator 15′ being mounted at the upper end of the flue in the manner set forth in connection with the embodiment shown in Fig. 1. 60 indicates the thermostat. 61 indicates the gas supply pipe connected with the valved chamber of the thermostat and to a burner 62, which may be of any desired construction.

The unit comprises a bell shaped portion or inverted bowl 63 and a plurality of individual conduits 64 separate from each other and disposed in side by side spaced relation and extending vertically, being connected at their lower ends to the bell 63 and at their upper ends to a chamber 65. As will be understood from the drawings, (1) the side walls of each conduit are parallel to each other and extend transversely across the bell 63 from one side to the other side thereof, and these walls are connected at their ends by end walls to form a relatively wide narrow conduit through which the products of combustion flow; and (2) the conduits are in spaced relation to form between them water passages 64′, the spacing of the side walls by preference being substantially equal to the spacing between the conduits. The upper walls of the chamber 65 are connected to the collar 58a, so that the chamber 65 and collar 58a form a common outlet member for all of the conduits or passages 64. In the form of construction illustrated, three conduits 64 are shown, but as many may be provided as desired. The lower ends of the side walls of the intermediate conduit and inner side walls of the outer conduits diverge, as shown at 66, and are connected to each other and the wall of the bell at the points designated 67, the arrangement of the walls 66 and their connection with the wall of the bell being such that the open ends of the conduits within the bell have substantially the same area, as clearly shown in Fig. 28.

As shown, the burner 62 is located below the bell so that the heat and products flow therein and then into the conduits 64, the bell serving to collect the radiant heat that is present to more effectively heat the walls of the conduits 64 as the heat and products of combustion flow upwardly therethrough. Due to the spacing of the conduits 64, they form between them throughout their length circulation spaces or passages 64′ for the water. To provide for the free circulation of the water into the lower portions of the passages, the opposite sides of the bell between the lateral ends of the conduits have inwardly extending converging portions 69 which are connected to the sides 66 of the conduits and the connected ends 67 of the sides to form inlet passages or ports 70 at either side of the circulation spaces 64′. The side and end walls of the chamber 65 and walls of the conduits 64 at their upper ends are similarly constructed to effect the free circulation of the heated water out of the spaces 64′ as it rises therein. In this form of construction the circultion of the cold water into the lower ends of spaces 64′ and circulation of the heated water from the upper ends of the passages takes place freely and the danger of foreign matter collecting on any of the walls 66 is reduced to a minimum. It will also be noted that the water circulation passages are open at their opposite lateral sides from end to end, so that the water is free to circulate into and out of the passages or entirely through them, thus providing for free movement of all currents set up due to heating and unobstructed intermingling of heated portions with colder portions of the water.

The lower or open end of the bell 63 is provided with a flange 63a preferably similar to the flange 4a already described and adapted to be secured in a liquid tight manner to the wall of the opening in the container bottom. By preference, the intermediate portions of the conduits 64 may be shaped to deflect the direction of flow of the products of combustion, the purpose being to cause a mixing and agitation thereof, so that all of the heat units therein will come in contact with the conduit walls, and displace therefrom cooled portions of the products, whereby these walls will absorb a high percentage of the heat units. For this purpose the side walls have successive portions $i$, $i'$, inclined to the vertical in opposite directions, the corresponding portions $i$, $i'$, of all the side walls being parallel so that the water passages 64' will have similarly arranged portions, whereby different portions of the water are directed against the conduit walls with the result that the water is quickly heated and a rapid circulation thereof induced.

71 indicates a circulation casing or shell surrounding the heating unit 58 and flue 59 and forming therearound a space for the free circulation upwardly of the water heated by the unit. The lower portion of the casing 71 is enlarged to leave ample space for water around the unit, but it is somewhat smaller than the bell 63, so that the latter may form a seat for the lower end of the casing—see Fig. 25. The cold water in the lower portion of the container flows into the ports 70 through the lower end of the casing 71 and the heated water is discharged through the upper end thereof. To insure ample supply of water for contact with the unit walls and to insure the rapid circulation of the portion which is heated, the lower end of the casing 71 may be provided with cut-aways 72, as shown in Fig. 25. Any suitable means may be provided for maintaining the upper portion of the casing 71 in concentric relation to the flue 59.

Referring to Fig. 32, 73 indicates a container mounted on a suitable support 73a. 74 indicates a suitable water supply pipe, preferably extending through the top of the container. 75 indicates the outlet pipe for the hot water. 76 indicates a suitable thermostat controlling automatically the flow of gas through a pipe 76a, which leads to a burner 77. 78 indicates a casing for water. 79 indicates a heating unit embodying my invention and mounted within the casing 78. The unit shown therein is of the type and construction shown in Figs. 25 to 31, inclusive, but any of the other embodiments herein described may be used, the casing 78 being shaped accordingly. By preference, the flange 63a of the unit is connected in a liquid tight manner to the inner wall of the casing, preferably engaging an internal rib 78a thereon, and the collar 58a of the unit has connected to it, similarly to that already described, a tubular section 80, which, at its upper end, extends through an opening in the top of the casing. The upper end of the section 80 is threaded and engaged by a nut 81, which, when tightened on the section 80 against the casing top, serves to support the unit and maintain it in fixed relation to the casing. A suitable gasket is interposed between the nut 81 and top wall surrounding the opening for the section 80 to insure a liquid tight joint. The nut 81 is provided with an up-standing neck 82, which forms an annular seat for the lower end of a flue pipe 83. As shown, the burner 77 is associated with the lower open end of the casing 78, below the flange 63a of the unit, so that the heat and products of combustion flow up through the conduits 64 of the unit 79, the section 80 and flue pipe, the latter being vented in any desired manner. 84 indicates a pipe connected with the lower portion of the container 73 and with the side wall of the casing 78 above but as close as possible to the flange 63a of the heating unit. 85 indicates a pipe connected with the upper portion of the casing 78 and the discharge pipe 75, the pipes 84 and 85 forming a circulation system between the container and casing. 86 indicates a valved drain pipe, preferably connected to the pipe 84. 87 indicates a valved discharge device, such as a pet cock, mounted in the side wall of the casing 78 above but as close as possible to the unit supporting flange 63a, so that the water in the casing and accumulated sediment may be drained off.

It will be understood that the heat and products of combustion and radiant heat collected by the bell 63 of the unit 79 flow upwardly through the conduits 64 to heat the water in the casing 78 and the water therein flows through the water passages between the conduits 64 in the same manner as set forth in connection with the form of construction shown in Figs. 25 to 31, inclusive, so that further description will not be necessary.

It will be understood that the circulation casing for each of the forms of construction shown is not an essential feature of my heater or apparatus and that the units, or either thereof, will operate to effectively transfer the heat to the water without the use of such casing; however, by preference, such casing is used in certain embodiments of the invention for the purpose of keeping the heated and colder portions of the water separated, so that the up current of the water may be more effectively induced and the entire volume of water uniformly and quickly heated to the desired temperature. By conducting the heated water to the upper portion of the container and directing the water in the lower portion into contact with the heating unit, the accumulation of hot water in the upper portion increases and replaces the colder water below as fast as it enters into the circulation casing until the entire volume is heated.

In my construction of heating unit I materially increase the heated wall area and water contacting area; at the same time I divide the water into a plurality of relatively thin, rising columns so that it may be quickly heated and also caused to circulate rapidly.

In the forms of heating units herein disclosed, the gases and products of combustion are broken up, agitated and mixed in a manner to effectively heat a wall or walls of large area in contact with water with the result that a high percentage of heat units is transferred uniformly through the wall or walls to the water; on the other hand the water is directed through relatively narrow passages or conduits which tend to effect a rapid circulation of the water and this in turn maintains a wide difference in temperature between the surface of the bays in contact with the products of combustion and the surface in contact with the water, so that rapid absorption of heat units by the wall and the conduction of the heat therethrough results. Due to this rapid absorption of the heat units from the gases and products of combustion and transfer of heat through the bay walls, the length of travel of the products of combustion may be relatively short. This rapidity of heat transfer enables the heating unit to be shortened in height without affecting its efficiency and provides greater water capacity in any given size of container. In practice it has been found that in the use of a heating unit embodying the herein disclosed invention a high percentage of the heat units is absorbed from the products of combustion.

It will be noted that the products of combustion flow upwardly with minimum restriction thereto through vertical passages and that the water flows upwardly through passages in the same direction. The water in its passages being substantially surrounded with surfaces heated by the products of combustion, a rapid circulation results. It will also be noted that all of the heated walls with which the water contacts are constructed or shaped and arranged to materially reduce or substantially eliminate liming or the deposit of mineral or foreign matter in the water thereon, with the result that rapid heat absorption by these walls is insured. By reason of such rapid circulation and the shape, contour and arrangement of the walls forming the water bays, a scouring action takes place thereon to prevent any possible liming. The construction is advantageous in that the respective units herein disclosed are relatively small and compact and provide for a large supply of heated water from a container of relatively small storing capacity.

In actual use I have found that my heater has a relatively high efficiency so that for any given capacity of heater the cost of operation is reduced and the entire body of water in the container is heated from time to time quickly and uniformly. As a result the full capacity of the container is at all times maintained at substantially the desired temperature, except when a large portion of the hot water is drawn off, but due to the efficient action of the heater the water is quickly brought back to its normal storing temperature.

To those skilled in the art to which my invention relates many changes in construction and widely differing embodiments and applications of my invention will suggest themselves without departing from the spirit and scope thereof. My disclosures and the description herein are purely illustrative and are not intended to be in any sense limiting.

What I claim is:

1. In apparatus of the class described, the combination of a container for fluid, a heating means, a heating unit, through which the heat and products of combustion from said heating means pass, arranged within said container, the side wall of said unit at one side of a diametrical line comprising portions extending inwardly and outwardly in substantially parallel relation to form a series of relatively long longitudinally extending bays disposed transversely to said line on one surface of the wall and a series of relatively long longitudinally extending bays disposed transversely to said line on the other surface thereof, one of said series being for the heat and products of combustion and the other series being for the circulation of the fluid, the bays of one series being inter-related with the bays of the other series, and means connected to said unit for conveying away the products of combustion.

2. In apparatus of the class described, the combination of a container for fluid, a heating means, a heating unit, through which the heat and products of combustion from said heating means pass, arranged within said container, one side wall of said unit comprising longitudinally extending portions connected alternately along their longitudinal edges and correlated to form inter-related series of bays extending from end to end of the unit, one series for the circulation of the heat and products of combustion and the other series for the circulation of the fluid, an escape flue connected to the upper end of said unit and leading upwardly through said container, and a casing surrounding said unit and engaging the outer lateral side walls of one series of bays, said casing terminating at a point above the lower end of said series of bays.

3. In apparatus of the class described, the combination of a container for fluid, having an opening in one of its walls, a heating means, a hollow heating unit mounted in said opening with one open end arranged to receive the heat and products of combustion from said heating means and with its body portion extending into said container, each portion of the side wall at one side of a diametrical line comprising portions extending inwardly and outwardly in substantially parallel relation to form a series of longitudinally extending bays disposed transversely to said line on one surface of the wall and a series of longitudinally extending bays disposed transversely to said line on the other surface thereof, one series for the flow of the heat and products of combustion and the other series for the circulation of the fluid, and means connected to the other open end of said unit for conveying away the products of combustion.

4. An apparatus as claimed in claim 3 in which each bay on one side of said line is in alignment with a similar bay on the other side thereof.

5. In apparatus of the class described, the combination of a container for fluid having an opening in its bottom, a vertically arranged casing having its lower portion mounted in and connected to the wall of said opening and its upper portion extending into said container, the side wall of said casing at one side of a diametrical line comprising portions extending inwardly and outwardly in substantially parallel relation to form longitudinally extending series of bays disposed in a direction transverse to said line, one series opening along their inner portions within the casing and the other series opening along their outer portions exteriorly thereof to permit the fluid to flow into them, webs for closing the lower ends of the fluid circulation bays, a flue connected with the upper end of said unit for conveying away the products of combustion, and heating means below said casing.

6. An apparatus as claimed in claim 5 in which a heating means is arranged below and substantially in the vertical plane of each of said webs.

7. In apparatus of the class described, the combination of a container for fluid having an opening in its bottom and an opening in one wall in the upper portion of said container, a heating means below said container, and a conduit for the heat and products of combustion mounted in said openings and leading through said container, whereby its side walls are surrounded with the fluid therein and its lower open end receives heat and the products of combustion from said heating means, a portion of the side wall of said conduit within said container being corrugated on longitudinal lines to form series of inter-related circulation bays having walls disposed substantially parallel to each other and extending toward the opposite portion of said conduit in a direction transverse to a diametrical line, one series opening interiorly of said conduit for the distribution of the heat and products of combustion and the other series opening exteriorly thereof for the circulation of the fluid.

8. In apparaus of the class described, the combination of a container for fluid having a top, vertical side walls and a bottom formed with an opening, a heating means below said container, a conduit mounted in said opening and arranged in an upright position in said container, whereby that portion of the conduit within said container is surrounded by and in contact with the fluid and its lower open end receives heat and the products of combustion from said heating means, the lower portion of said conduit being enlarged and having vertical side walls corrugated on vertical lines from end to end to form bays extending transversely to a diametrical line and having substantially parallel sides and a central passage in communication therewith and sets of similar bays in communication with the interior of said container for the fluid.

9. An apparatus as claimed in claim 8 in which is provided a casing open at its opposite ends and surrounding the lower portion of said conduit and engaging the lateral side edges of the first mentioned sets of bays.

10. An apparatus as claimed in claim 1 in which the sides of the bays from end to end comprise contiguous sections disposed at angles to each other, each section of one side being substantially parallel to corresponding sections of the remaining sides to form reversely extending deflecting passages in connected relation for the products of combustion and fluid.

11. In apparatus of the class described, the combination of a container for fluid having an opening in its bottom, a heating means below said container, a hollow heating element mounted in said opening with its lower open end arranged to admit heat and products of combustion from said heating means and with its body portion within said container, each side wall of said element at either side of an imaginary line being extended inwardly and outwardly on transverse lines to form series of inter-related circulation bays, one series for the heat and products of combustion and the other series for the fluid, the lateral side walls of each series of fluid bays comprising contiguous portions extending in opposite directions relative to the vertical, the respective portions of each said side wall being substantially parallel to corresponding portions of the lateral side walls of the other series of fluid bays.

12. In apparatus of the class described, the combination of a container for fluid having an opening in its bottom, a heating means below said container, a hollow heating unit mounted in said opening with its lower open end arranged to admit heat and products of combustion from said heating means and with its body portion within said container, each side wall of said unit at either side of an imaginary line being extended inwardly and outwardly to form series of inter-related circulation bays, one series for the heat and products of combustion and the other series for the fluid, the sides of the bays from end to end comprising contiguous portions extending in opposite directions relative to the vertical, the respective portions of one side being substantially parallel to corresponding portions of the remaining sides, whereby the bays constitute connected circulation passages at angles to each other, and the lateral side walls of each series of fluid bays comprising contiguous portions extending in opposite directions relative to the vertical, the respective portions of each said side wall being substantially parallel to corresponding portions of the lateral side walls of the other series of fluid bays.

13. An apparatus as claimed in claim 1 in which the sides of the bays from end to end comprise contiguous sections disposed at angles to each other, the respective sections of one side being substantially parallel to corresponding sections of the remaining sides, whereby the bays constitute connected portions disposed at angles to each other, the sections of each side being connected by curved walls.

14. An apparatus as claimed in claim 12 in which the sections of each side and each lateral side wall are connected by curved walls.

15. A hollow circulation member for products of combustion and fluid having opposed portions of its side walls shaped to form series of transversely extending bays leading inwardly in substantially parallel relation approximately to the center thereof, one of said series opening interiorly of said member and the other series opening exteriorly thereof, webs for closing the first mentioned series of bays at one end and webs for closing the last mentioned series of bays at the opposite end.

16. A hollow circulation member for products of combustion and fluid having its side walls at opposite sides of a median diametrical line shaped circumferentially to form series of bays extending from end to end of said member parallel to its axis and transversely inwardly approximately to the center of the member, one of said series opening along their inner portion interiorly of said casing and the other series opening along their outer portion exteriorly thereof, webs for closing the first mentioned series of bays at one end of said member and webs for closing the last mentioned series of bays at the opposite end of said member.

17. A circulation member as claimed in claim 16 in which the series of bays are disposed transversely to said line and the series on one side of said line align with corresponding bays on the other side thereof.

18. A circulation member as claimed in claim 16 in which each of the last mentioned series of bays terminate in a common plane at one side of said median line.

19. A circulation member having a portion of its side wall shaped from end to end to form series of bays, one of said series opening along its inner portion interiorly of said member and the other series opening along its outer portion exteriorly thereof, means for closing ends of the first mentioned series of bays at one end of said member, and means for closing the ends of the last mentioned series of bays at the opposite end thereof, each said bay consisting of connected portions inclined in opposite directions from end to end of said member.

20. A circulation member having opposite portions of its side wall shaped from end to end to form series of bays, the bays of one series opening along their inner portions interiorly of said member and the bays of the other series opening along their outer portions exteriorly thereof, corresponding bays formed in the opposite portions of said side wall being disposed in aligned relation, means for closing the ends of the first mentioned series of bays at one end of said member, and means for closing the ends of the last mentioned series of bays at the opposite end thereof, the lateral side walls of the last mentioned bays consisting of contiguous sections inclined in opposite directions to form angularly disposed connected passages between said aligned bays.

21. A circuation member as claimed in claim 19 in which the lateral sides of the last mentioned bays consist of contiguous sections inclined in opposite directions to form angularly disposed connected passages between said aligned bays.

22. A circulation member comprising side walls and forming an opening at one end, a manifold along its other end and having an outlet, each side wall being corrugated on longitudinal lines substantially from its open end to said manifold to form series of bays, one of said series opening interiorly of said member and connected at their upper ends to said manifold and the other series opening exteriorly thereof, and means for closing the ends of the last mentioned series of bays adjacent the opening into said member.

23. A member as claimed in claim 22 in which the manifold consists of portions extending from the opposite ends of said member inwardly and the outlet is interposed between and is connected to the inner ends of said manifold portions.

24. A heating unit as claimed in claim 22 in which each of the bays consist of a series of connected portions extending in opposite directions from end to end thereof.

25. In apparatus of the class described, the combination of a container for water, a heating means below said container, the bottom of said container being formed with an elongated opening, a hollow elongated member within said container with its lower open end mounted in said opening and provided at its upper end with a manifold and an outlet leading therefrom, each side wall of said member being corrugated from its lower end to said manifold to form series of bays, the bays of one series opening along their inner portions interiorly of the member and connected to said manifold and the bays of the other series opening exteriorly along their outer portions into said container, means for closing the lower ends of the last referred to bays, a flue connected to said outlet and leading upwardly through the interior of said container and extending through one wall thereof, and a casing surrounding said member and engaging the lateral side edges of the bays that open interiorly of said member.

26. In apparatus of the class described, the combination of a container for water, a heating means below said container, the bottom of said container being formed with an elongated opening, a hollow elongated member within said container with its lower open end mounted in said opening and arranged to receive the products of combustion from said heating means, and an outlet leading therefrom, each side wall of said member being corrugated from end to end to form series of bays, the bays of one of said series opening along their inner portions interiorly of the member and the bays of the other series opening exteriorly along their outer portions into said container, the sides of said bays having portions extending in opposite directions relative to the vertical from end to end to form circuitous passages, means for closing the lower ends of the last referred to bays, and a flue connected to said outlet and leading upwardly through the interior of said container and extending through one wall thereof.

27. In apparatus of the class described, the combination of a container for water, a heating means below said container, the bottom of said container being formed with an elongated opening, a hollow elongated member within said container with its lower open end mounted in said opening and provided at its upper end with a manifold and an outlet leading therefrom, each side wall of said member being corrugated from its lower end to said manifold to form series of bays, the respective bays formed in one side wall being in alignment with corresponding bays formed in the other side wall, and the bays of one series opening along their inner portions interiorly of the member and connected to said manifold and the bays of the other series opening exteriorly along their outer portions into said container, means for closing the lower ends of the last referred to bays, and a flue connected to said outlet and leading upwardly through the interior of said container and extending through one wall thereof.

28. In apparatus of the class described, the combination of a container for water, a heating means below said container, the bottom of said container being formed with an elongated opening, a hollow elongated member within said container with its lower open end mounted in said opening and arranged to receive products of combustion from said heating means, and an outlet leading therefrom, each side wall of said member being corrugated from end to end to form series of bays, the bays of one series opening along their inner portions interiorly of the member and the bays of the other series opening exteriorly along their outer portions into said container, each bay formed in one side wall being aligned with a corresponding bay formed in the opposite side wall and the lateral sides of the bays that open exteriorly having portions extending in opposite directions relative to the vertical from end to end of said member to form a circuitous passage between them, means for closing the lower ends of bays that open exteriorly, and a flue connected to said outlet and leading upwardly through the interior of said container and extending through one wall thereof.

29. In apparatus of the class described, the combination of a container for water, a heating means below said container, the bottom of said container being formed with an elongated opening, a hollow elongated member within said container with its lower open end mounted in said opening and arranged to receive products of combustion from said heating means and an outlet leading therefrom, each side wall of said member being corrugated from end to end to form series of bays, the bays of one series opening along their inner portions interiorly of the member and the bays of the other series opening exteriorly along their outer portions into said container, each bay formed in one side wall being aligned with a corresponding bay formed in the other side wall and the sides of the bays and the lateral sides of the bays that open exteriorly having portions extending in opposite directions relative to the vertical from end to end to provide circuitous passages between the bay sides and a circuitous passage between the aligned bays that open exteriorly, means for closing the lower ends of the bays that open exteriorly and a flue connected to said outlet and leading upwardly through the interior of said container and extending through one wall thereof.

30. A circulation member having corrugated walls extending substantially from end to end of said member to form circulation passages, the opposite longitudinal sides of said corrugations having contiguous portions reversely arranged relative to each other to cause deflection of the fluid flowing through said passages.

31. A member as claimed in claim 30 in which the member is provided with sets of corrugations and the inner opposing walls of the said sets have contiguous portions reversely arranged relative to each other.

32. A circulation member adapted to be surrounded with water and comprising a plurality of longitudinally extending elongated passages for products of combustion and water disposed in alternate relation, the side walls of said passages being disposed substantially parallel to each other and transverse to a line cutting said member diametrically the passages for the products of combustion being open at their lower ends to receive the products of combustion, and an outlet member in communication with the upper ends of the passages for the products of combustion.

33. A circulation member adapted to be surrounded with water and comprising a plurality of longitudinally extending passages for products of combustion and water disposed in alternate relation, the passages for the products of combustion being open at their lower ends to receive the products of combustion, the separating walls of said passages being substantially parallel to each other and disposed at substantially right angles to a line cutting said member diametrically, and an outlet member in communication with the upper ends of the passages for the products of combustion.

34. A circulation member adapted to be surrounded with water and comprising a plurality of longitudinally extending passages for products of combustion and water disposed in alternate relation, the passages for the products of combustion being open at their lower ends to receive the products of combustion and the separating walls of said passages being substantially parallel and substantially uniformly spaced and disposed at substantially right angles to a line cutting said member diametrically and an outlet member in communication with the upper ends of the passages for the products of combustion.

35. In apparatus of the class described, the combination with a container having a bottom formed with an opening, of a relatively small circulation casing having its lower edge secured in said opening and comprising a plurality of webs extending from opposite side portions of the lower edge of said casing toward each other and substantially uniformly spaced distances equal to their widths, walls rising vertically from the sides and free ends of said webs and forming transversely disposed passages in side by side parallel relation for the fluid in said container and products of combustion, a discharge flue in communication with the upper ends of the passages for the products of combustion, and a heating means below and in alignment with each said webs.

36. In apparatus of the class described, the combination of a vertically disposed container having side walls in parallel relation from bottom to top, the bottom of said container being formed with a central opening, a hollow casing having its lower open end secured in a liquid tight manner in said opening, the upper end of said casing having a discharge opening, a flue connected with said discharge opening, the side walls of said casing being corrugated along vertical lines to form transversely disposed bays opening interiorly thereof and bays opening into said container, and heating means below the lower open end of said casing.

37. A circulation member such as specified in claim 32 characterized by the elongated passages for the products of combustion being individual and separate one from the other, and all connected at their lower ends with a common inlet chamber for the products of combustion.

38. A circulation member such as specified in claim 32 wherein the elongated passages for the products of combustion are individual and separate one from the other and are in combination with a common inlet chamber to which their lower ends are connected, the walls of said inlet chamber adjacent to the end walls of the conduits united thereto being inwardly inclined and converging, forming flow passages exterior of the casing for water into which the circulating member is placed leading to the spaces between the conduits and serving on the interior of the casing to direct products of combustion into the conduits.

39. A circulation member such as specified in claim 32 characterized by the elongated passages for the products of combustion being individual and separate one from the other, each conduit, between its upper and its lower ends, having successive sections disposed at angles to each other.

In testimony whereof I have hereunto subscribed my name.

JAMES P. MORLEY.